(12) United States Patent
Goeltzenleuchter et al.

(10) Patent No.: US 6,587,112 B1
(45) Date of Patent: Jul. 1, 2003

(54) WINDOW COPY-SWAP USING MULTI-BUFFER HARDWARE SUPPORT

(75) Inventors: Courtney Goeltzenleuchter, Fort Collins, CO (US); Darel N Emmot, Ft Collins, CO (US); Jon L Ashburn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 09/613,229

(22) Filed: Jul. 10, 2000

(51) Int. Cl.[7] ................................................. G06T 1/00
(52) U.S. Cl. ..................................................... 345/532
(58) Field of Search ................................ 345/545, 546, 345/543, 544, 532, 533, 537, 591, 564, 568, 550, 419, 420, 424, 643, 558, 559, 501, 502, 504, 781, 804, 839; 703/23

(56) References Cited

U.S. PATENT DOCUMENTS

| 4,967,375 A | * 10/1990 | Pelham et al. ............... 345/564 |
| 5,313,567 A | * 5/1994 | Civanlar et al. ............. 345/424 |
| 5,805,868 A | 9/1998 | Murphy ....................... 395/502 |
| 5,959,638 A | 9/1999 | Forrest et al. ............... 345/511 |

OTHER PUBLICATIONS

Sproull et al. "The 8 by 8 Display" ACM Transactions on Graphics, vol. 2, No. 1, pp 32–56, Jan., 1983.*

* cited by examiner

Primary Examiner—Almis R. Jankus
(74) Attorney, Agent, or Firm—T. Grant Ritz (57) ABSTRACT

A 3D graphics controller configurable to simultaneously copy portions of a pixel region between a back buffer and a front buffer. The 3D graphics controller includes four memory controllers, each controlling a bank of frame buffer memory. A sequence of addresses defining a pixel region is generated. The addresses are distributed to the four memory controllers according to the memory banks (addresses) coupled thereto. Each memory controller is configured to read pixels according to the addresses and a first offset; and write the pixels according to the addresses and a second offset. The offsets are chosen so as not to shift pixels within the banks. Therefore, each memory controller simultaneously and independently copies a portion of the pixel region without accessing any other memory banks resulting in a copy of the entire pixel region.

21 Claims, 9 Drawing Sheets

WINDOW COPY-SWAP USING MULTI-BUFFER HARDWARE SUPPORT

BACKGROUND OF THE INVENTION

1. Field of the Invention

This invention relates generally to a computer graphics system, and more particularly, to a method and apparatus for quickly copying data from one window to another window in frame buffer memory.

2. Description of Related Art

Graphic capabilities are now common in a variety of applications for personal computers, including three-dimensional (3D) games, multimedia communications and computer-aided design applications (CAD), which perform many graphic functions, including 3D animation, sophisticated shading algorithms, transparency and alpha-blending, live video windows, stereo 3D windows, etc. To perform the desired graphic functions with some realism, the computer system must be capable of performing more sophisticated functions in less time. This is particularly true for graphics animation. The computer system must be able to draw complicated graphical figures and fill them while performing complicated 2D and 3D functions, such as patterning, depth cueing, light source modeling, alpha blending, texture mapping, anti-aliasing, hidden surface removal, stenciling, panning and zooming, as well as depth and color interpolation, among other functions. The computer system must also draw the graphical figures at a much greater speed while manipulating the pixel data being refreshed to a display output device.

A typical computer system has a central processing unit (CPU) with a main memory and a graphics display subsystem with its own memory subsystem. Part of this graphics memory subsystem is a frame buffer that stores data that is to be displayed on a display output device such as a monitor, TV or flat panel display. A display controller reads the data in the frame buffer line-by-line, converts the data into an analog video signal using a digital-to-analog converter (DAC), and transmits the analog video signal to the display output device. This process is generally known as "refreshing" the display output device. The entire contents of the frame buffer need to be transferred to the display output device continuously for the display to be visible. In the case of a monitor, this is typically at least 60 times per second, so that the viewer sees what appears to be a constant, unflickering picture. The line-by-line refreshing generally begins at a window in the frame buffer corresponding to the upper left-hand corner of the display screen and continuing to the lower right-hand corner. The refreshing operation returns from the lower right-hand corner to the upper left-hand corner during a vertical retrace period.

Typically, the frame buffer is constructed of some form of dynamic random access memory (DRAM) such as, asynchronous DRAM, synchronous DRAM ("SDRAM"), double-data-rate synchronous DRAM ("DDRDRAM"), synchronous graphic DRAM ("SGRAM"), or Rambus direct DRAM ("RDRAM").

To animate objects on the display output device coupled to the frame buffer; animation software/hardware renders a series of frames with slight picture changes in each frame. To provide smooth animation, at least 15 to 30 new frames should be displayed each second. As the picture in one frame changes to the picture in the next frame, continuous motion is presented. To accomplish this, the frame buffer must be continually updated.

The ability of the frame buffer to both receive information and transfer that information to an output display simultaneously causes certain difficulties. If the animation software/hardware writes to frame buffer memory while the display controller is scanning the image in the frame buffer memory to a display, then the display may present information from more than one animation frame at time. This problem is referred to as frame tear. Frame tears are only important where motion from one frame to the next causes the elements presented on the display to be obviously distorted. When this occurs, the distortion caused may be extremely disconcerting to the viewer.

To eliminate frame tears, certain computer systems utilize a system referred to as double buffering. Double buffering allows for one image to be rendered while another is being displayed. Double buffering is often achieved by rendering the non-visible image in main memory and then quickly copying the image data to the frame buffer for display on the display output device. A better alternative is a double buffered system which provides two regions of memory in the frame buffer wherein each region of memory may furnish pixel information to the display controller and ultimately the display output device.

A first region of memory known as a front visible buffer provides a first animation frame to the display output device, and no changes are made in that memory region while it provides information to the display output device. While the front buffer is displayed on the display output device, animation software/hardware renders the next animation frame in the second region of memory known as a back non-visible buffer. When the animation software/hardware completes the next animation frame the display is changed such that the back buffer becomes the displayed frame and the front buffer becomes the "work" region in which the animation software renders the next animation frame. The change occurs during the vertical retrace period to further avoid causing frame tears. In this manner, no pixel information is ever written to the region of memory that is visible on the display output device.

The process of making the back buffer visible may take many forms. The most straight-forward way is to copy data between the back and front buffers. Fundamentally, this is handled with a stream of read pixel and write pixel operations. Since copying pixels from one region to another is very common, a special graphics function called a bit block transfer (bitBlt) has been developed. The bitBlt command is found in most graphics controller implementations and is often implemented directly in the graphics hardware for highest speed. The command is used to copy an array of pixels from a rectangular window in memory, the source window, to a destination window. This command is also useful to move data from a back buffer located in main memory instead of frame buffer memory. Although, the bitBlt command is well known and widely supported, it has a disadvantage of being slow.

Other methods of making the back buffer visible are available through graphics application programming interfaces (APIs), such as OpenGL, Direct3D and PHIGS (Programmer's Hierarchical Interactive Graphics System). For example, OpenGL provides a command called glxSwapBuffer that, depending upon the implementation, may cause hardware to simply swap what buffer is the front and back buffer without actually copying data. This method, limited to double buffers implemented as two regions of the frame buffer, is very fast and is often referred to as "fast buffer-swap." However, some applications, especially Windows NT applications, prefer that the contents of the back buffer remain intact, and thus prefer that the swap be implemented as a pixel data copy. Accordingly, a faster method of copying data is desired.

SUMMARY OF THE INVENTION

According to a preferred embodiment, the invention provides a method and apparatus for efficiently copying pixels from different portions of a frame buffer. The invention may be viewed as a display controller for copying a pixel region. The display controller may comprise a frame buffer configured into n interleaved banks where n is greater than one, each bank having a width of m contiguous pixel locations where m is greater than zero; n memory controllers, each memory controller coupled to a bank for reading and writing pixels, each memory controller having a pair of buffer pointers for holding first and second address offsets; and a pixel addressing means coupled to the n memory controllers for generating pixel addresses defining the pixel region with respect to a first address offset, the pixel region contained within the frame buffer, and for distributing the addresses to memory controllers according to the pixel locations each memory controller is coupled thereto, wherein the addresses distributed to the memory controllers cause each memory controller to read pixels within its bank according to the addresses and the first address offset, and write the pixels within its bank according to the addresses and the second address offset.

The invention may also be viewed as a method of copying a pixel region. The method may be broadly conceptualized by the following steps: providing a frame buffer configured into n interleaved banks where n is greater than one, each bank having a width of m contiguous pixel locations where m is greater than zero; providing n memory controllers, each memory controller coupled to a bank, and each memory controller having a pair of buffer pointers for holding address offsets; generating pixel addresses defining a pixel region with respect to a first offset, the pixel region contained within the frame buffer; routing the pixel addresses to the memory controllers according to the pixel locations each memory controller is coupled thereto; and each memory controller, reading pixels within its bank according to the pixel addresses and a first offset and writing the pixels within its bank according to the pixel addresses and a second offset.

Each memory controller may further include an additional pair of buffer pointers for holding address offsets and the method may further comprise: each memory controller, reading pixels within its bank according to the pixel addresses and a third offset and writing the pixels within its bank according to the pixel addresses and a fourth offset. The frame buffer may be configured into a first and second buffer, wherein the pixels are read from the first buffer and written to the second buffer.

Other features and advantages of the invention will become apparent to one of ordinary skill in the art upon examination of the following detailed description of illustrative embodiments in conjunction with the accompanying drawings. It is intended that all such features and advantages be included herein within the scope of the invention and protected by the claims.

BRIEF DESCRIPTION OF THE DRAWINGS

The foregoing and other aspects, features, and advantages of the present invention will become apparent from the following detailed description, which taken in conjunction with the accompanying drawings illustrate by way of example the principles of the invention.

DETAILED DESCRIPTION

As shown in the drawings for purposes of illustration, the invention is embodied in a computer system S that includes a graphics controller for efficiently copying pixels from different regions of a frame buffer (i.e., fast copy-swap operation). The graphics controller preferably includes a memory controller with multi-buffer support which is conveniently useable to copy the pixels without moving the pixel data beyond the memory controller.

Figure 1:
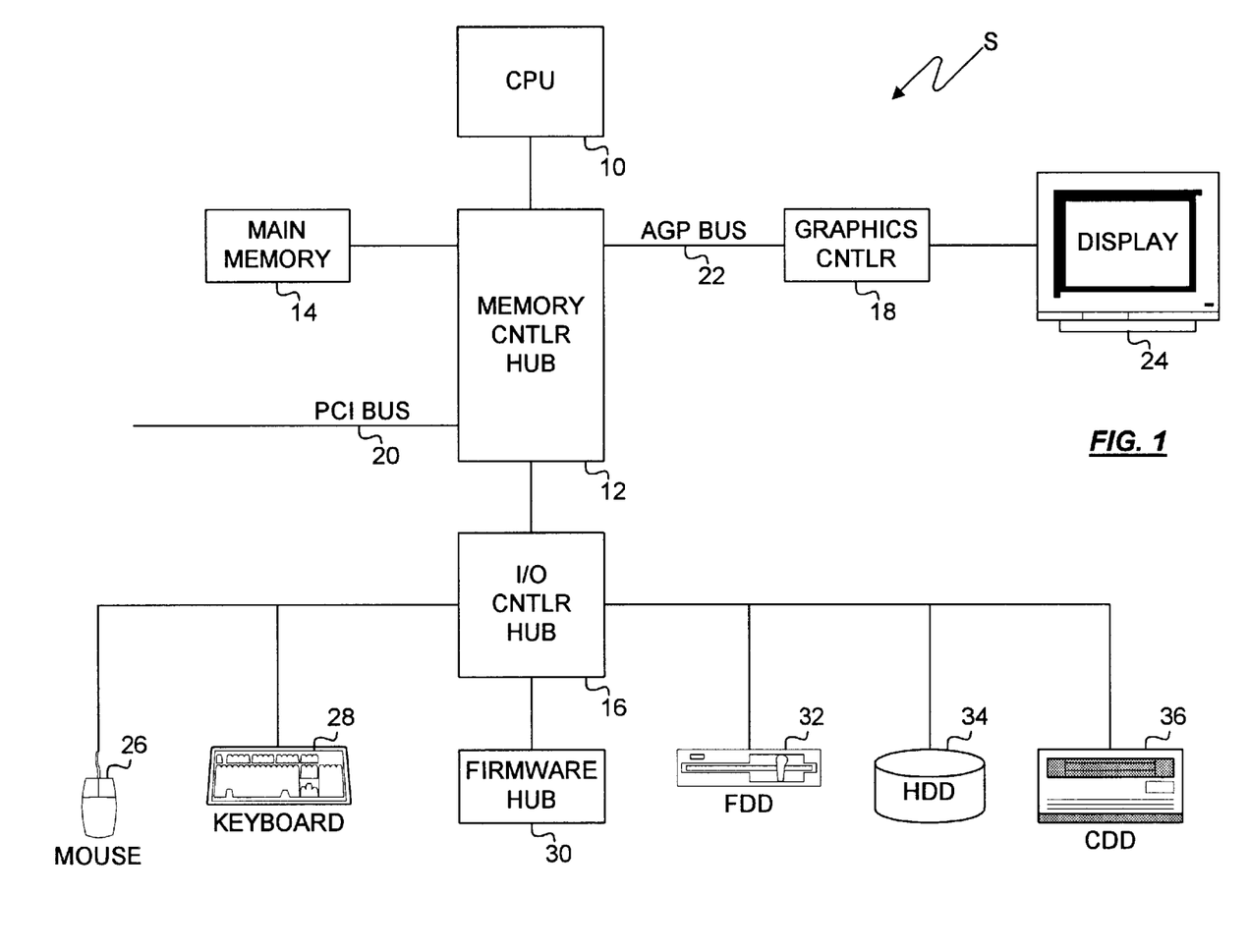
FIG. 1 is a block diagram illustrating a computer system S according to a preferred embodiment.

Referring first to FIG. 1, there is illustrated a computer system S according to a preferred embodiment. A central processing unit (CPU) 10 is coupled to a memory controller hub 12 or "northbridge" as it is sometimes called. The memory controller hub 12 is further coupled to a main memory 14, an input/output controller hub 16, and a graphics controller 18. The memory controller hub 12 also provides an interface to a peripheral component interface (PCI) bus 20. The graphics controller 18 is connected to the memory controller hub 12 by an accelerated graphics port (AGP), or AGP bus 22. Output of the graphics controller 18 is provided to a display output device 24 for displaying 2D and 3D graphics, text and video.

The input/output controller hub 16, or "southbridge" as it is sometimes called, is further connected to a pointing device 26, keyboard 28, firmware hub 30, floppy disk drive (FDD) 32, hard disk drive (HDD) 34, and compact disk drive (CDD) 36.

In the operation of the computer system S, a graphics application is executed on the CPU 10. The graphics application receives input from interaction devices such as the pointing device 26 or keyboard 28, and generates images for output on the display output device 24. The graphics controller 18 receives a series of graphics output commands from the application to develop the images that contain both a geometric description of what is to be displayed and the attributes describing how the objects should appear.

Figure 2:
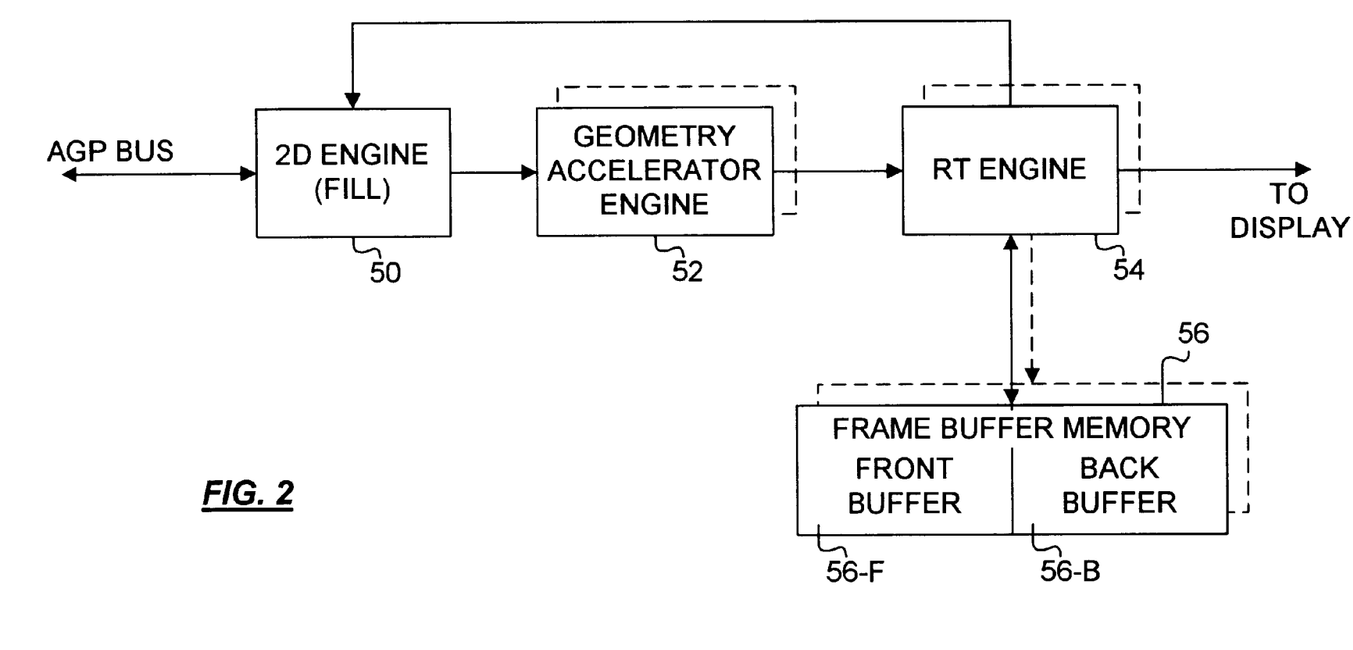
FIG. 2 is a block diagram illustrating the graphics controller of FIG. 1.

Referring next to FIG. 2, there is illustrated a high-level block diagram of the graphics controller 18 showing a graphics pipeline. Data is received by the graphics controller 18 from the CPU 10 over the AGP bus 22 into a two-dimensional (2D) engine 50 for handling 2D functions such as drawing primitives (points, lines, curves, circles, polygons, etc.) filling primitives, clipping primitives, and generating characters. Next in the graphics pipeline is one or more geometry accelerator engines 52 that receive commands and data from the CPU 10, via the 2D engine 50, for performing 3D geometrical transformations, such as translation, scaling, and rotation. In one variation, up to twenty geometry accelerator engines 52 may be used in parallel. Data from the 2D engine 50 and geometry accelerator engine 52 is provided to one or more RT engines 54 for performing rasterization, texture mapping and display scanning on rendered images which are stored in a frame buffer memory 56. In one variation, up to four RT engines could be used in parallel.

The frame buffer memory 56 is configurable as a double-buffered frame buffer, meaning one front visible buffer 56-F and one back non-visible buffer 56-B. Double buffering eliminates flickering by allowing one image to be rendered in one buffer while an image in another buffer is being displayed.

Figure 3:
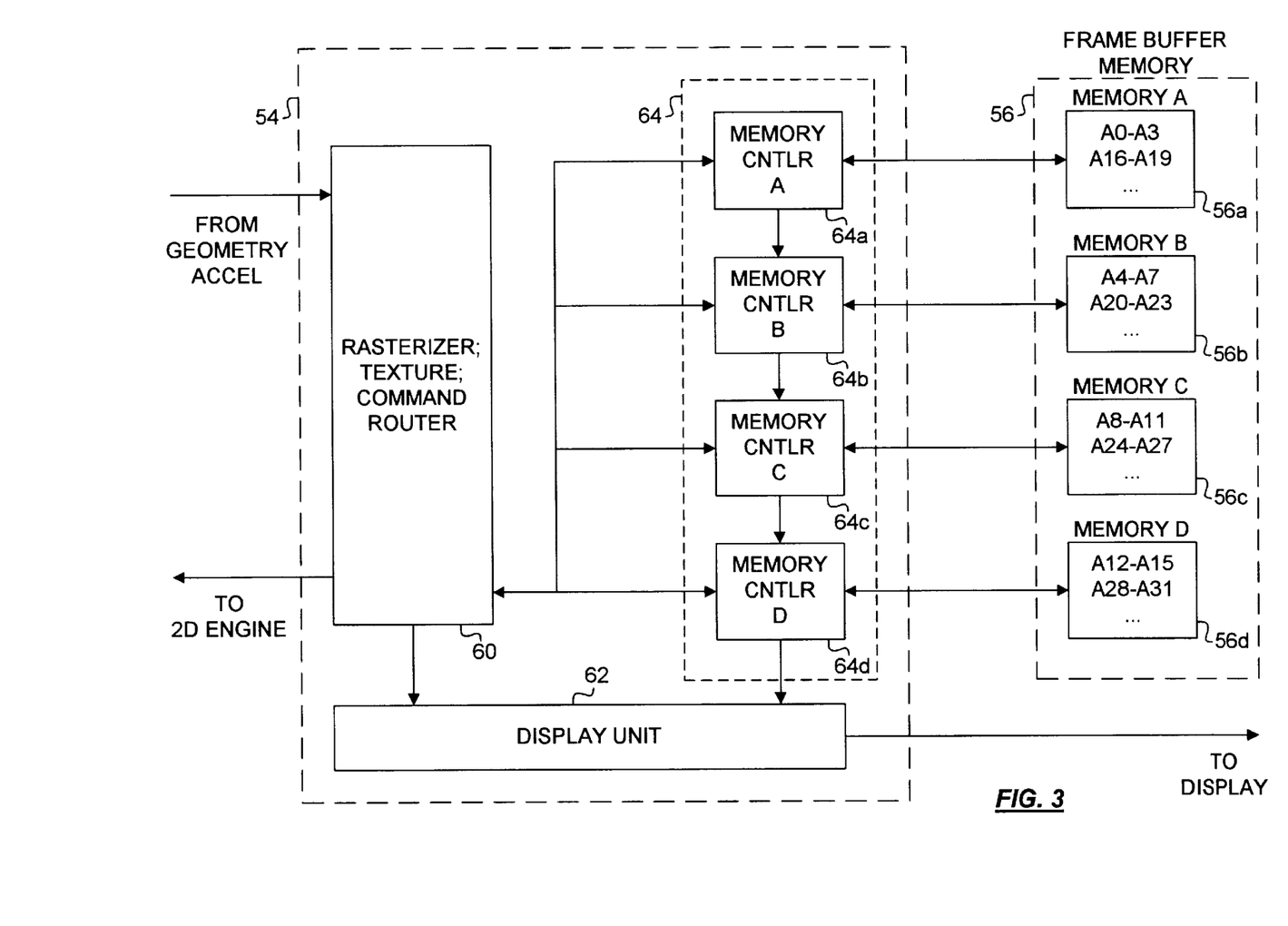
FIG. 3 is a block diagram illustrating a rasterizer/texture engine according to a preferred embodiment.

Now referring to FIG. 3, there is illustrated a more detailed block diagram of the RT engine 54. The RT engine 54 includes a rasterizer/texture and command router unit 60 connected between the geometry accelerator 52 and a display unit 62. The rasterizer/texture and command router unit 60 is further connected to a main memory controller 64, which is connected to the frame buffer 56. The rasterizer/texture and command router unit 60 rasterizes images and applies textures.

In a preferred embodiment, the main memory controller 64 is comprised of four separate memory controllers 64*a–d*, each separate controller responsible for handling a bank of the frame buffer 56 in a block-interleaved fashion. In a preferred embodiment, four contiguous memory locations define a block, but larger or smaller blocks could be used. Thus, memory controllers A–D 64*a–d* control frame buffer portions A–D 56*a–d*. Each memory 56*a–d* may be one or more memory devices, or a memory module. Although a preferred embodiment uses four separate memory controllers, more or less may be used. The interleaving of the frame buffer 56 is on a block-basis (i.e., four pixels) according to a preferred embodiment, but other graduations may be used such as on a byte, word or double-word boundary. For example, in a preferred embodiment sixteen consecutively addressed, word-aligned, 32-bit pixels are distributed across the four memory controllers 64*a–d*. This allows many memory operations, such as fills and copying pixels from the back 56-B to front 56-F buffer, to be handled in parallel by the four memory controllers. More specifically, the fast copy-swap operation of the present invention can be performed simultaneously by the four memory controllers 64*a–d*.

Figure 4:
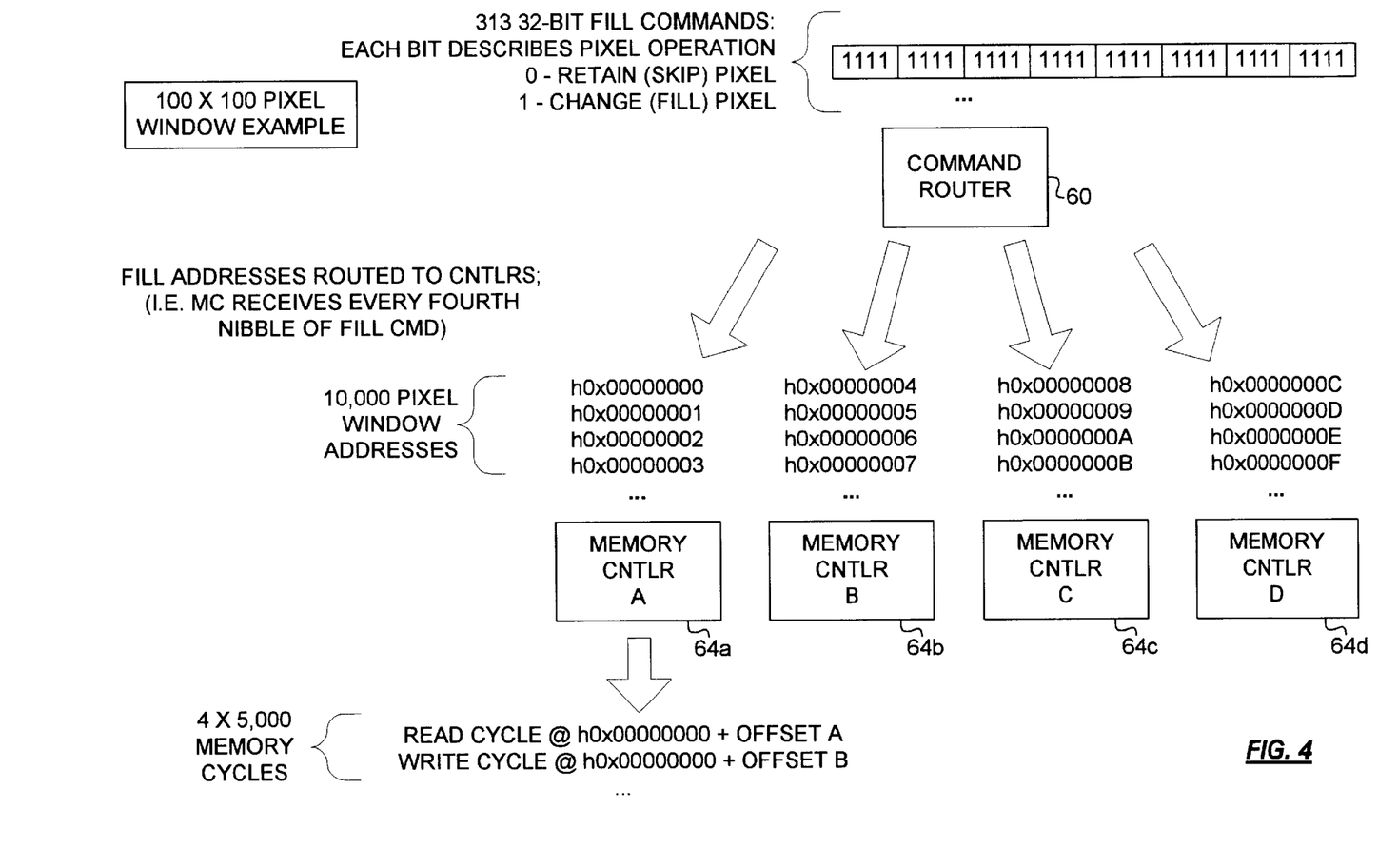
FIG. 4 is a conceptual diagram illustrating the function of the command router of FIG. 3, according to a preferred embodiment.

Now referring to FIG. 4, there is illustrated a conceptual diagram of command flow through the command router 60 and memory controller 64. The command router portion of the rasterizer/texture and command router unit 60 is responsible for receiving graphics commands and distributing the commands across the four memory controllers 64*a–d* according to the pixel addresses. Of particular importance to the present invention are pixel write commands such as fill commands.

When the memory controller 64 is configured to perform a fast copy-swap operation, the pixel addresses formed by pixel write commands are by the memory controller 64 to define a region of memory used in the fast copy-swap operation. Thus, the memory controller is essentially configured to convert a pixel write operation into a fast copy-swap operation (i.e., read/write operation). Address offsets in the memory controllers 64*a–d* are used to distinguish between a source region (i.e., read cycles) and a destination region (i.e., write cycles). For example, one offset may identify a 100×100 region of the back buffer 56-B and another offset may identify a 100×100 region of the front buffer 56-F.

The pixel write commands are generated by the 2D engine 50. The RT engine 54 is coupled to the 2D engine 50 by a 32-bit data path, which runs at a slower frequency than clocks internal to the RT engine 54. Thus, pixel write operations can oftentimes be a performance bottleneck due to the rate at which commands and data can be pushed through the graphics pipeline to update the buffers 56-F and 56-B. This is one reason why the 2D engine 50 is operable to develop batch executable command lists.

In a preferred embodiment, the batch executable command lists are formed using an object transfer count technique, as shown in FIG. 4 using an illustrative 100×100 pixel window. In this example, a fill command is used as a specific type of pixel write command. Fill commands are intended to identify which pixels are written/modified with a pre-loaded color register. Fill operations include a starting pixel address and one or more fill data words. As part of the fill command list, each bit in the fill data word corresponds to a pixel. A next bit position in the fill data word corresponds to a next pixel at a next address. If a data bit is set, the color register is applied to the pixel. If the bit is not set, the pixel is unchanged.

As the fill data word is parsed by the command router 60, the pixel operations are distributed to the four memory controllers 64*a–d*. For example, a fill operation affecting pixels at addresses 0x00000000–0x0000000F would be distributed as follows: addresses 0x000000000–0x00000003 to memory controller A 64*a*; addresses 0x00000004–0x00000007 to memory controller B 64*b*; addresses 0x00000008–0x0000000B to memory controller C 64*c*; and addresses 0x0000000C–0x0000000F to memory controller D 64*d*. The sequence is repeated for the entire fill region according to the pixel addresses. Thus, each memory controller 64*a–d* receives fill commands for four consecutive pixels.

In the preferred embodiment, a more efficient burst-type fill command is formed wherein a starting address is communicated followed by adjacent data words. This is an efficient mechanism for certain fill operations since the data is essentially expanded out after it passes through the graphics pipeline. Alternatively, the command list could be formed with a more conventional ADDRESS/DATA/ADDRESS/DATA sequence.

One benefit of the above technique is the way the fill region is expanded into a copy operation. For a 100×100 pixel region, approximately 313 32-bit fill data words are generated by the 2D engine 50 and moved through the graphics pipeline to the command router 60. The command router 60 expands each bit of a fill data word into a pixel fill address, resulting in approximately 10,000 pixel addresses sent to the memory controllers 64*a–d*. In turn, each of the memory controllers 64*a–d* perform a read cycle and a write cycle on each pixel address (using different address offsets) for a total of 20,000 cycles (using a single pair of buffer pointers, as described below).

Figure 5A:
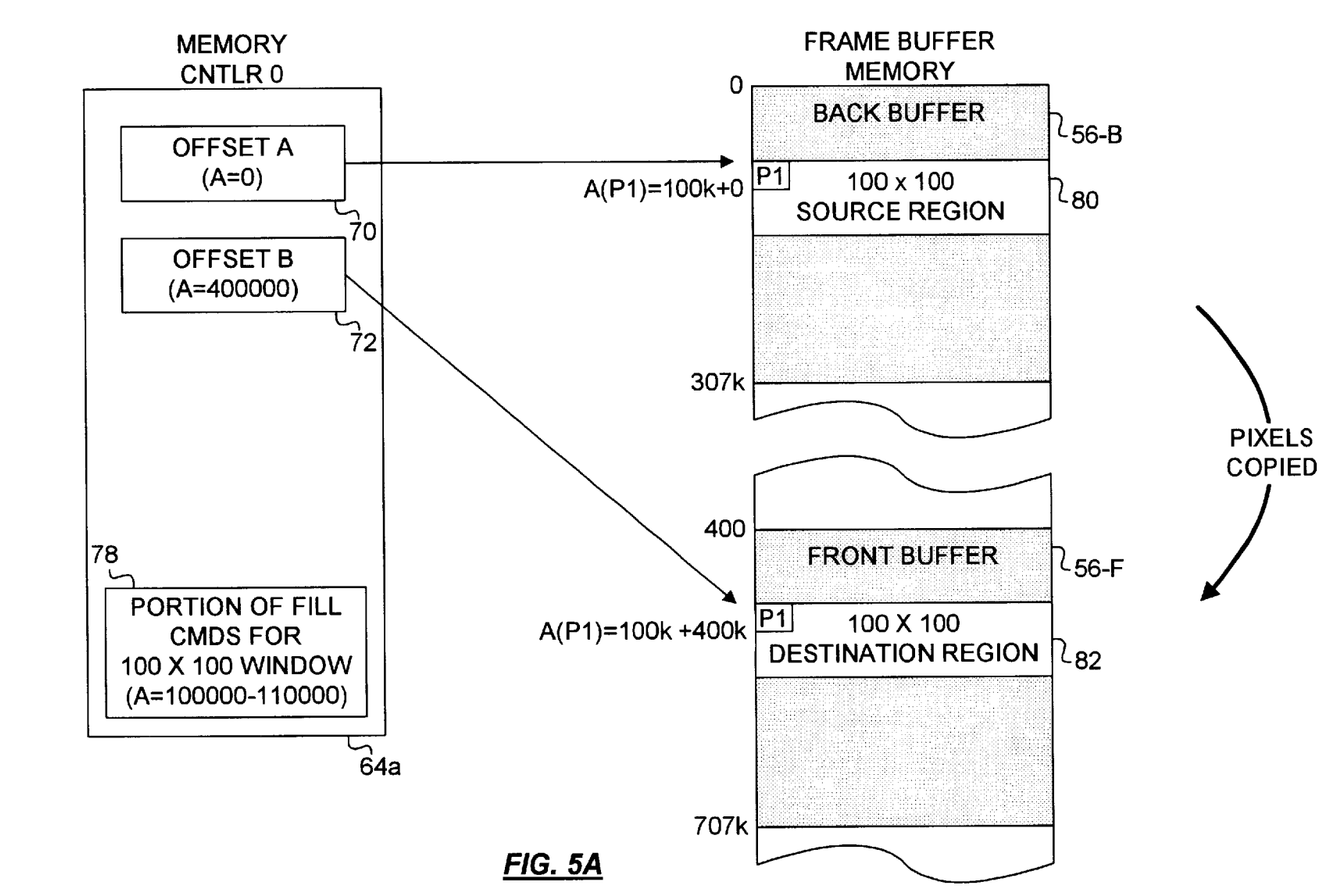
FIGS. 5A–B are operational diagrams illustrating buffer pointer usage according to a two pointer implementation and a four pointer implementation, according to a preferred embodiment.

Reference is directed to FIG. 5A. Each memory controller 64*a–d* includes a first-in-first-out (FIFO) memory 78 for holding the command lists received from the command router 60. Each memory controller 64*a–d* also includes a pair of multi-buffer pointers 70 and 72 for supporting defined OpenGL multi-buffer functionality. In graphics operations, certain pixel write operations such as a fill are often directed at an entire buffer or window (or large portion of the buffer). Rather than execute one set of fill commands for the front buffer 56-F and another set of the same fill commands for the back buffer 56-B, OpenGL provides a mechanism to "simultaneously" perform the fill commands at more than one offset: i.e., one offset for the front buffer 56-F and another offset for the back buffer 56-B. This functionality is embodied in the RT engine 54 and each of the memory controllers A–D 64*a–d*.

In the operation of one of the memory controllers such as memory controller 64*a*, when the memory controller 64*a* is configured for fast copy-swap mode the pixel write commands contained in command buffer 78 are performed as read-modify-write commands. Data is preferably not modified—so a copy is performed. The read cycles are executed according to the defined pixel region (i.e., command list 78) and an offset A 70. The write cycles are executed according to the defined pixel region and an offset B 72. For example, in FIG. 5A a 100×100 source pixel region 80 starting at a physical address based on offset A 70 is copied to a destination region 82 starting at a physical address based on offset B 72. The actual physical addresses are calculated by adding the offset to each pixel address of the fill operation.

For example, the address for a first pixel (P1) in the source region 80 is computed by adding the address offset A 70 to the first fill region address (e.g., 100k+0). The address for the first pixel (P1) of the destination region 82 is computed by adding the address offset B 72 to the same first fill region address (e.g. 400k+0). Thus, once the entire range of fill addresses 78 is processed, the 100×100 pixel region is copied from the back buffer 56-B to the front buffer 56-F. The offsets are chosen so as not to shift pixel data within the banks.

There are other ways to compute the source and destination pixel addresses using the offsets. For example, the base address (offset A 70) of the source pixel region 80 can be included in the fill addresses 78 from the 2D engine 50. In this case, the address offset A 70 does not need to be added to the fill addresses 78 to address the source region 80. Offset A 70 and offset B 72 are still initialized as before with the base addresses for each region to compute the destination region 82 addresses. The difference between the address offset A 70 and the address offset B 72 (e.g., 300k) is added to each fill address to compute the destination region 82 addresses. The difference is computed by subtracting offset A 70 from offset B 72. The difference may be negative, if the destination region 82 is located in memory 56 before the source region 80.

In yet another embodiment, the offsets A 70 and B 72 are initialized as before except that offset B 72 contains the difference between the base address of the source region 80 and the destination region 82 (e.g., 400k−100k=300k). The source region 80 addresses are computed by adding offset A 70 to the fill addresses 78. The destination region 82 addresses are computed by adding offset B 72 to the source region 80 addresses. For example, the address for a first pixel (P1) in the source address region is computed by adding the address offset A 70 to the first fill region address (e.g., 100k+0). The address for the first pixel (P1) of the destination region is computed by adding the difference contained in offset B 72 to the same first fill region address (e.g. 300k+100k). Again, the difference can be negative.

In the preferred embodiment, the defined pixel region 78 to be copied has certain characteristics that provide beneficial results with the multiple memory controllers 64*a–d*. Typically, front 56-F and back 56-B buffers have the same number of rows and columns of pixels: so the characteristics of the front and back buffers are substantially similar. The source and destination copy regions inherently have the same number of rows and columns of pixels. If between the source 80 and destination 82 copy regions, each pixel remains in the same position relative to a 16-pixel alignment, each memory controller A–D 64*a–d* can copy its portion of the defined pixel region entirely within its corresponding memory A–D 56*a–d*. Thus, each pixel destination address should be some multiple of 16 relative to the corresponding pixel source address. As a result, all four memory controllers A–D 64*a–d* may simultaneously operate on a portion of the defined pixel region 78 to quickly perform the fast copy-swap operation.

The 16-pixel alignment is due to the way memory 56 is interleaved four ways on a four-pixel boundary. Other variations may be implemented. For example, if a four-way interleave were implemented on a two-pixel alignment (i.e., each memory controller handling only two consecutive pixels), then each pixel copied between the source and destination copy regions must remain in an eight-pixel alignment. If a two-way interleave (i.e., two memory controllers) were implemented on a four-pixel alignment, then each pixel copied between the source and destination copy regions should also remain in an eight-pixel alignment. Essentially, any variation where the source and destination pixel addresses are handled by the same memory controller 64*a–d* produces the desirable results. As a result, pixel data does not need to be copied between memory controllers A–D 64*a–d* and the fast copy-swap operation is highly efficient.

Figure 5B:
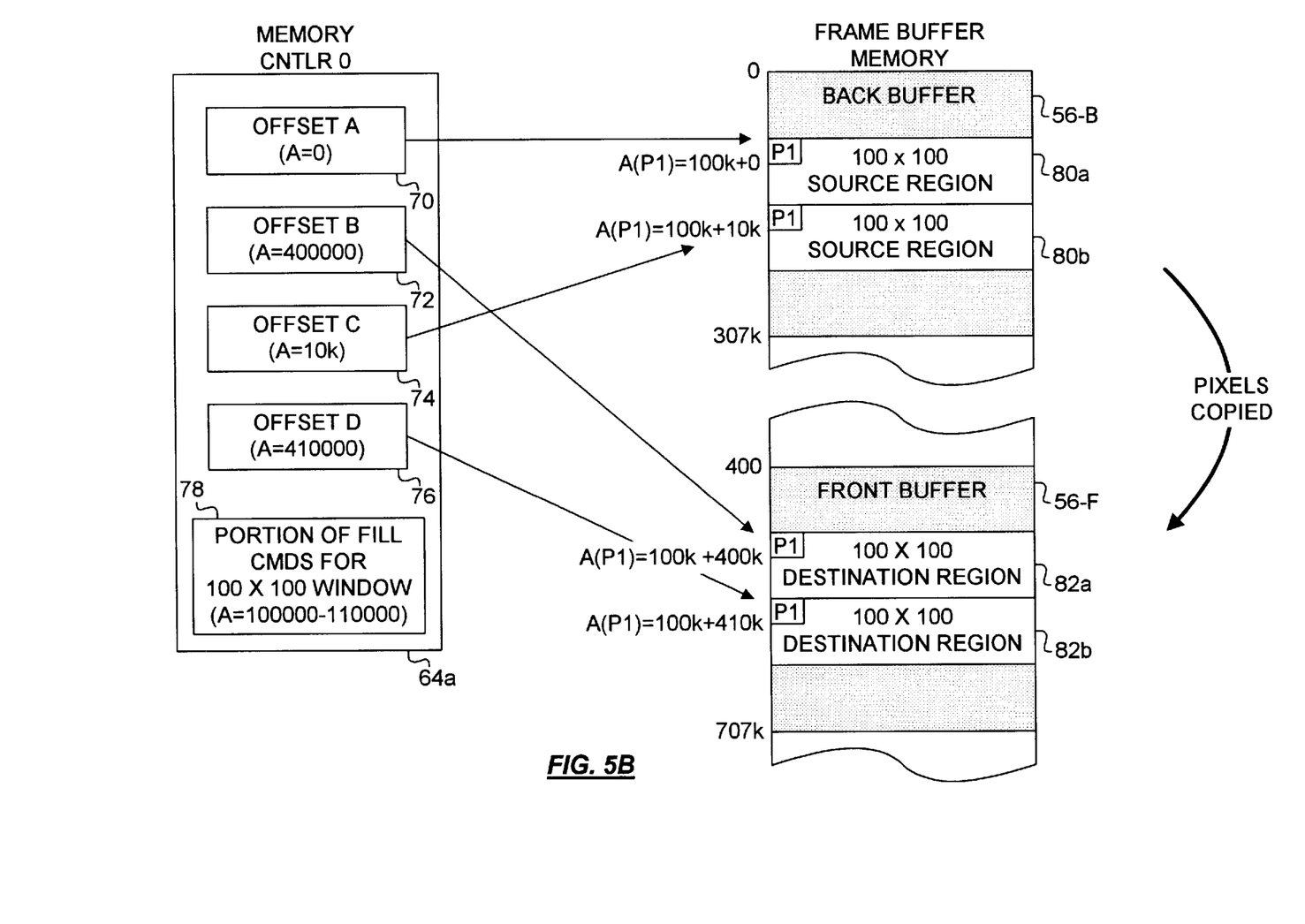

Now referring to FIG. 5B, there is illustrated a further enhancement to the memory controller A 64*a* described in FIG. 5A. In addition to the first pair of buffer pointers 70 and 72, each memory controller 64*a–d* also includes a second pair of multi-buffer pointers 74 and 76 for supporting double buffering and stereo applications according to OpenGL multi-buffer functionality. In this variation, all four multi-buffer pointers 70–76 are used to locate the fill region 78 at four exclusive regions. In this way, the single fill command list 78 can be applied four times: for two source regions and for two destination regions. Thus, the single fill command list for the 100×100 pixel region (10,000 pixels) results in 20,000 pixels being copied, instead of the 10,000 pixel region for a single pair of pointers (FIG. 5A).

Figure 6:
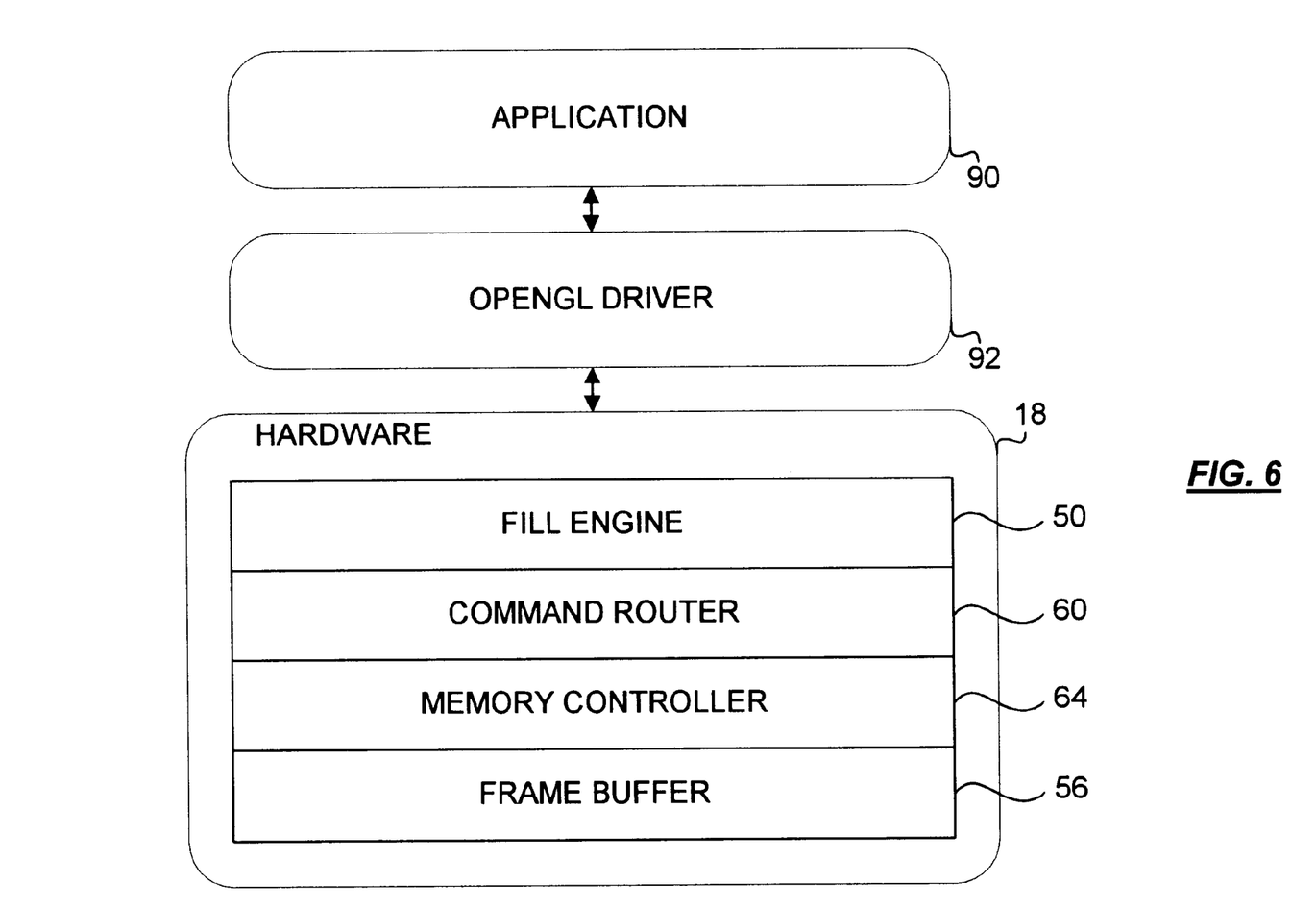
FIG. 6 is an block diagram illustrating a software architecture according to a preferred embodiment.
Figure 7:
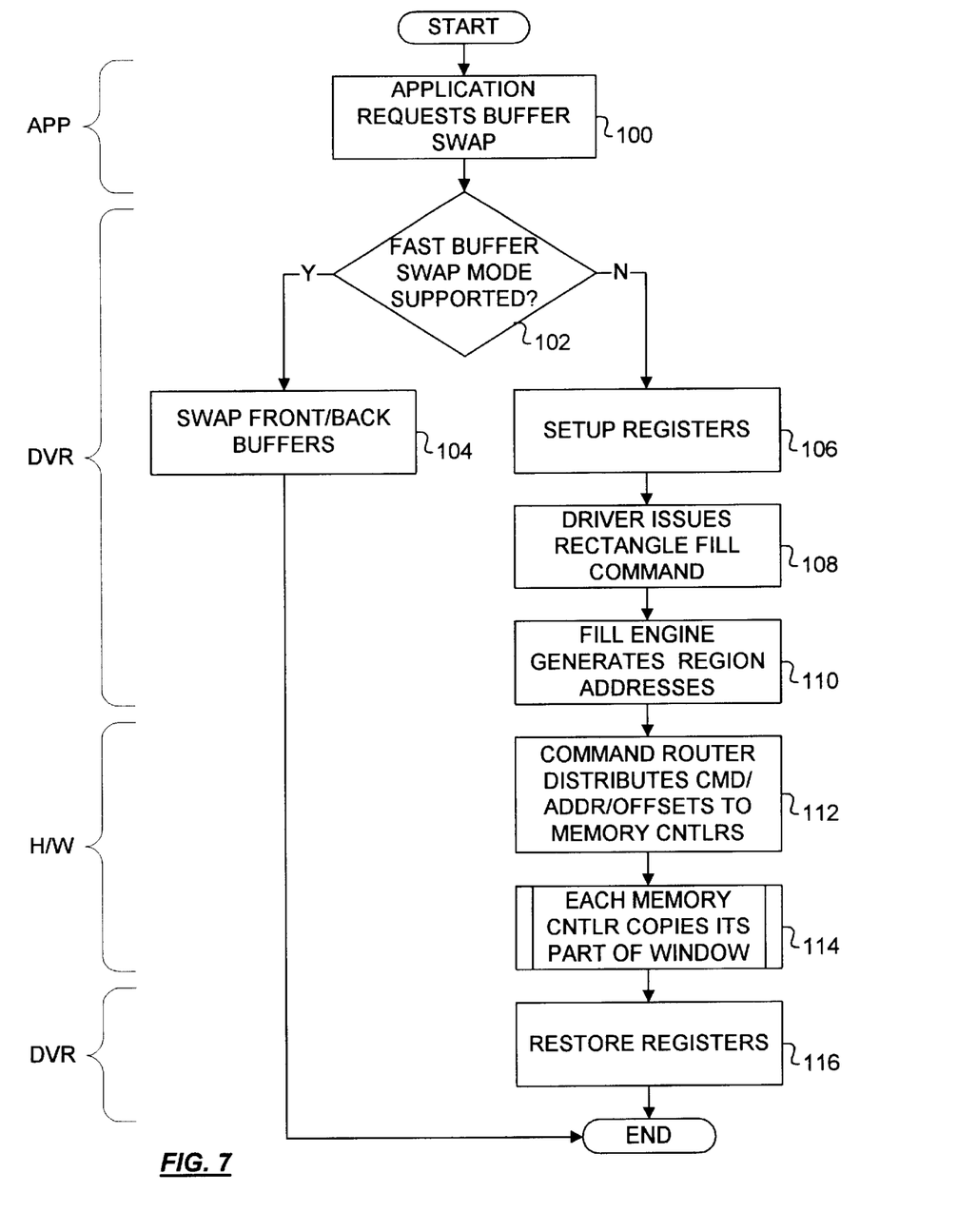
FIG. 7 is a flow diagram illustrating a method of copying pixels according to a preferred embodiment.

Now referring to FIGS. 6 and 7, the operation of copying pixels from the back buffer 56-B to the front buffer 56-F (i.e., fast copy-swap operation) will be further described. The process begins when an application 90 requests the front and back buffers to be swapped by issuing a buffer swap command at step 100. An OpenGL driver 92 intercepts the command at step 102 to determine what type of buffer swap method should be performed.

In general, the fastest method is usually to execute a fast buffer swap. This method swaps what buffer is the front and back buffer without actually copying data. By definition, the contents of the back buffer are undefined after the swap, which is undesirable to certain applications. Therefore, certain applications will specify that a buffer swap operation be performed using a conventional bitBlt copy operation. The application 90 indicates this preference by setting a bit related to the OpenGL driver 92 during configuration.

In step 102, the OpenGL driver 92 determines whether the application prefers the fast buffer swap method. If so, the fast buffer swap method is performed at step 104 to make the back buffer 56-B visible. If not so, the OpenGL driver 92 proceeds to step 106 where a fast copy-swap method is initiated.

At step 106, the OpenGL driver 92 initializes the buffer pointers 70 and 72 so that buffer pointer 70 is the source offset and and buffer pointer 72 is the destination offset of a window. The memory controller 64 is configured to write the destination window with the data read from the source window (as with a fill operation); and a fast copy-swap enable bit is set. Next at step 108, the driver 92 issues a fill command for the pixels in the source window that need copying. In response, at step 110 the 2D engine 50 generates a command list containing addresses and data for the window and forwards the command list through the pipeline. The fill commands normally cause a read-modify-write operation on each pixel to modify all or a portion of the pixel color. Each pixel fill command includes a pixel write address.

At step 112, the command router 60 allocates the commands across the multiple memory controllers 64a–d according to the addresses. In response, at step 114 the memory controllers 64a–d perform a read-modify-write operation on the window with buffer pointer 70 specifying the source window offset and buffer pointer 72 specifying the destination window offset. In contrast to a fill operation, the data that is read from the source window is preferably not modified as it is written to the destination window. At step 116, the buffer pointers 70 and 72 are restored; and the fast copy-swap enable bit is disabled. The operation is then completed.

Figures 8A, 8B:
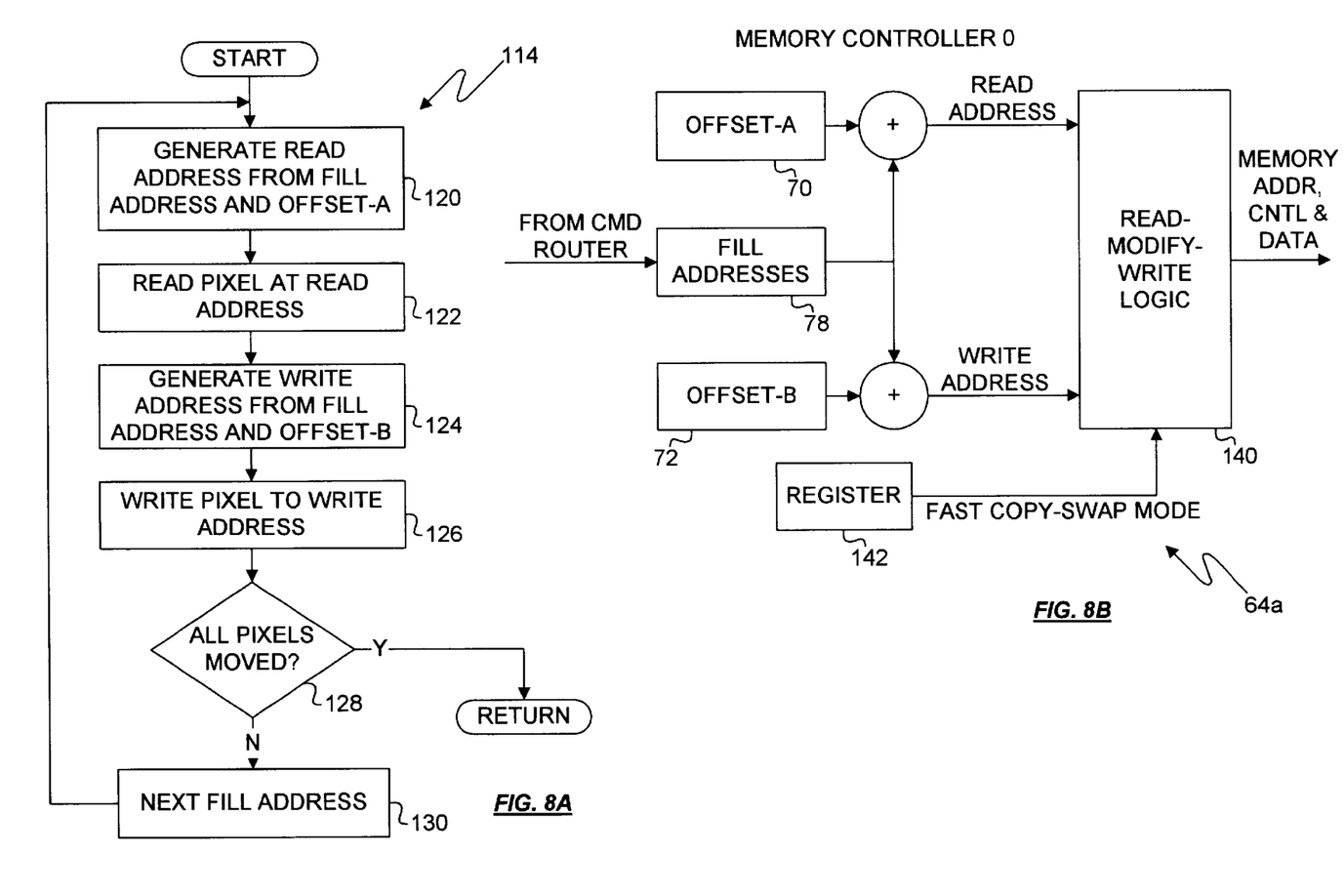
FIG. 8A is a flow diagram illustrating further detail of the method of copying pixels illustrated in FIG. 7.
FIG. 8B is a block diagram illustrating further details of the memory controllers of FIGS. 3 and 4, according to a preferred embodiment.

Referring now to FIGS. 8A–B, there is illustrated further details of the read-modify-write operation 114 performed by the memory controllers 64a–d based on a fast copy-swap configuration bit of a register 142 as set in step 106. Although described with respect to a single memory controller A 64a, this process is performed by each of the memory controllers A–D 64a–d, according to the command list 78 written thereto. It is understood that the following process is performed by hardware, and therefore, the steps may be executed substantially simultaneously. For example, the read address is generated when each read cycle is performed.

At a step 120, a read address is generated to read a pixel according to the command list 78. Each read address is generated by adding a pixel write address specified in the command list 78 to the offset A 70. For example, in FIG. 5A a first pixel write address was determined to be at A=500,000 (fill address of 100,000 added to an offset of 400,000). At step 122, read-modify-write logic 140 of the memory controller A 64a performs a read cycle according to the read address. The data is temporarily stored in the memory controller A 64a.

Next at step 124, a write address is generated to write the pixel according to the same address of the pixel fill command. However, instead of using the same offset, the read-modify-write logic 140 is configured to use an address offset stored in offset B 72. Thus, each write address is generated by adding the pixel write address specified in the command list 78 to the offset B 72. At step 126, the read-modify-write logic 140 performs a write cycle according to the write address. The data temporarily stored in the memory controller A 64a is written preferably without modification. Thus, a pixel copy has been performed.

At step 128, the memory controller A 64a determines whether all the pixels have been copied (i.e., whether the command list 78 is exhausted). If true, the operation is complete and control returns to step 114. Otherwise, the operation continues to the next pixel address (step 130 branching to step 120).

Thus, because the data is not required to be passed between the four memory controllers A–D 64a–d, the four memory controller can operation simultaneously and in parallel to perform the pixel copy operation. In the variation containing a second pair of multi-buffer pointers 74–76, steps 120–130 are repeated according to the offsets C and D 74–76.

Therefore, it can be seen from the foregoing that the invention provides a fast copy-swap method and apparatus that executes faster than conventional bitBlt's to provide compatibility with certain software. Although several embodiments of the invention have been described and illustrated, the invention is not to be limited to the specific forms or arrangements of the parts so described and illustrated. Thus, having illustrated and described the principles of the invention in a preferred embodiment, it should be apparent to those of ordinary skill in the art that the invention can be modified in arrangement and detail without departing from such principles.

What is claimed is:

1. A display controller for copying a pixel region, comprising:

a frame buffer configured into n interleaved banks where n is greater than one, each bank having a width of m contiguous memory locations where m is greater than zero;

n memory controllers, each memory controller coupled to a bank for reading and writing pixels, each memory controller having a pair of buffer pointers for holding first and second address offsets; and a pixel addressing means coupled to the n memory controllers for generating pixel addresses defining the pixel region with respect to a first address offset, the pixel region contained within the frame buffer, and for distributing the addresses to memory controllers according to the pixel locations each memory controller is coupled thereto, wherein the addresses distributed to the memory controllers cause each memory controller to read pixels within its bank according to the addresses and the first address offset, and write the pixels within its bank according to the addresses and the second address offset.

2. The display controller of claim 1, wherein each memory controller includes an additional pair of buffer pointers for holding third and fourth address offsets, and wherein the addresses distributed to the memory controllers cause each memory controller to read pixels within its bank according to the addresses and a third address offset, and write the pixels within its bank according to the addresses and a fourth address offset.

3. The display controller of claim 1, wherein each memory location has a position within the bank, and wherein the buffer pointers do not cause pixels to be shifted within the bank as they are written.

4. The display controller of claim 1, wherein the frame buffer is further configured into a first buffer and a second buffer, and wherein the pixels are read from the first buffer and written to the second buffer.

5. The display controller of claim 1, wherein m and n are four.

6. The display controller of claim 1, wherein the buffer pointers are OpenGL multi-buffer pointers.

7. The display controller of claim 1, wherein the pixel region is contained within multiple banks.

8. The display controller of claim 1, wherein the pixel addresses result from a fill operation.

9. A method of copying a pixel region, comprising:
 (a) providing a frame buffer configured into n interleaved banks where n is greater than one, each bank having a width of m contiguous memory locations where m is greater than zero;
 (b) providing n memory controllers, each memory controller coupled to a bank, and each memory controller having a pair of buffer pointers for holding address offsets;
 (c) generating pixel addresses defining a pixel region with respect to a first offset, the pixel region contained within the frame buffer;
 (d) distributing the pixel addresses to the memory controllers according to the memory locations each memory controller is coupled thereto; and
 (e) each memory controller, reading pixels within its bank according to the pixel addresses and a first offset and writing the pixels within its bank according to the pixel addresses and a second offset.

10. The method of claim 9, wherein each memory controller includes two pair of buffer pointers for holding address offsets, the method further comprising:
 (f) each memory controller, reading pixels within its bank according to the pixel addresses and a third offset and writing the pixels within its bank according to the pixel addresses and a fourth offset.

11. The method of claim 9,
 wherein the frame buffer provided is further configured into a first buffer and a second buffer, and
 wherein the pixels are read from the first buffer and written to the second buffer.

12. The method of claim 9, wherein each memory location has a position within the bank, and wherein the buffer pointers do not cause pixels to be shifted within the bank as they are written.

13. The method of claim 9, wherein m and n are four.

14. The method of claim 9, wherein the buffer pointers are OpenGL multi-buffer pointers.

15. The method of claim 9, wherein the pixel region is contained within multiple banks.

16. The method of claim 9, wherein the pixel addresses result from a fill operation.

17. A method of copying a pixel region in a frame buffer, the frame buffer configured into n interleaved banks where n is greater than one, each bank having a width of m contiguous memory locations where m is greater than zero, each memory location having a position within the bank, each bank exclusively coupled to one memory controller, the method comprising:
 (a) generating pixel addresses for the pixel region;
 (b) distributing a portion of the pixel addresses to each memory controller according to the memory locations each memory controller is coupled thereto;
 (c) each memory controller reading pixels within its bank according to the pixel addresses; and
 (d) each memory controller writing the pixels within its bank according to the pixel addresses and an address offset,
 whereby the address offset maintains the position of each pixel and each memory controller independently copies a portion of the pixel region.

18. The method of claim 17, wherein the address offset is the difference between a first address offset and a second address offset.

19. The method of claim 17,
 wherein the frame buffer provided is further configured into a first buffer and a second buffer, and
 wherein the pixels are read from the first buffer and written to the second buffer.

20. The method of claim 17, wherein m and n are four.

21. The method of claim 17, wherein the buffer pointers are OpenGL multi-buffer pointers.

* * * * *